US008014319B2

(12) United States Patent
Hei et al.

(10) Patent No.: US 8,014,319 B2
(45) Date of Patent: Sep. 6, 2011

(54) PATH MANAGEMENT DEVICE AND PROGRAM STORING MEDIUM

(75) Inventors: Yuichiro Hei, Fujimino (JP); Tomohiko Ogishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 9 days.

(21) Appl. No.: 12/142,359

(22) Filed: Jun. 19, 2008

(65) Prior Publication Data

US 2009/0003367 A1    Jan. 1, 2009

(30) Foreign Application Priority Data

Jun. 26, 2007    (JP) ................................ P2007-167398

(51) Int. Cl.
*H04L 12/28* (2006.01)
(52) U.S. Cl. ........................................ 370/255; 370/256
(58) Field of Classification Search .................. 370/255, 370/256

See application file for complete search history.

(56) References Cited

U.S. PATENT DOCUMENTS

| | | | | |
|---|---|---|---|---|
| 5,881,246 A * | 3/1999 | Crawley et al. | ............... | 709/238 |
| 5,995,503 A * | 11/1999 | Crawley et al. | ............... | 370/351 |
| 6,151,324 A * | 11/2000 | Belser et al. | ................. | 370/397 |
| 6,252,856 B1 * | 6/2001 | Zhang | ........................... | 370/254 |
| 6,711,171 B1 * | 3/2004 | Dobbins et al. | ............... | 370/400 |
| 6,775,709 B1 * | 8/2004 | Elliott | ........................... | 709/238 |
| 6,973,028 B1 * | 12/2005 | Huai et al. | ..................... | 370/222 |
| 7,206,309 B2 * | 4/2007 | Pegrum et al. | ................. | 370/389 |
| 7,257,086 B2 * | 8/2007 | Brown et al. | .................. | 370/242 |
| 7,301,911 B2 * | 11/2007 | Mack-Crane et al. | ........ | 370/254 |
| 7,334,047 B1 * | 2/2008 | Pillay-Esnault | ............... | 709/242 |
| 7,342,874 B2 * | 3/2008 | Pegrum et al. | ................. | 370/218 |
| 7,343,424 B2 * | 3/2008 | Amato | .......................... | 709/241 |
| 7,362,709 B1 * | 4/2008 | Hui et al. | ........................ | 370/237 |
| 7,455,551 B2 * | 11/2008 | Sakamoto et al. | ............. | 439/595 |
| 7,483,398 B1 * | 1/2009 | Huai et al. | ..................... | 370/258 |
| 2002/0141429 A1 * | 10/2002 | Pegrum et al. | ................. | 370/422 |

(Continued)

FOREIGN PATENT DOCUMENTS

JP        2002271384 A        9/2002

(Continued)

OTHER PUBLICATIONS

Moy, J. "OSPF Version 2", Ascend Comm. Inc., Apr. 1988; pp. 1-244.

(Continued)

*Primary Examiner* — Daniel J Ryman
*Assistant Examiner* — Jay P Patel
(74) *Attorney, Agent, or Firm* — Morgan, Lewis & Bockius LLP

(57) ABSTRACT

A path management device of the present invention manages information about communication paths in a communication network, the communication network including a plurality of routers mutually connected by means of a communication line, link states between the plurality of routers being shared among each of the plurality of routers by means of link state advertisement messages that are announced from each of the plurality of routers, and routing tables being created in each of the plurality of routers based on shortest path trees, and the path management device includes: a receiving unit that receives the link state advertisement messages; a routing table creation unit that reproduces the shortest path trees and the routing tables of each of the plurality of routers based on the link state advertisement messages; and a routing table recording unit that records the reproduced routing tables of each of the plurality of routers.

4 Claims, 5 Drawing Sheets

U.S. PATENT DOCUMENTS

| | | | |
|---|---|---|---|
| 2002/0150094 A1* | 10/2002 | Cheng et al. | 370/389 |
| 2003/0172362 A1* | 9/2003 | Mack-Crane et al. | 716/12 |
| 2003/0198182 A1* | 10/2003 | Pegrum et al. | 370/225 |
| 2004/0042396 A1* | 3/2004 | Brown et al. | 370/227 |
| 2005/0083949 A1* | 4/2005 | Dobbins et al. | 370/395.53 |
| 2007/0058607 A1* | 3/2007 | Mack-Crane et al. | 370/351 |
| 2008/0075011 A1* | 3/2008 | Mack-Crane et al. | 370/238 |

FOREIGN PATENT DOCUMENTS

JP  2006140834 A  6/2006

OTHER PUBLICATIONS

Nanog, "Looking Glass Sites" Jun. 2008; pp. 1-3.

* cited by examiner

FIG. 6

2007/3/1 00:00:00    ROUTING TABLE

| destination | nexthop | cost |
|---|---|---|
| 10.0.1.0/24 | 192.168.1.1 | 100 |
| 10.0.2.0/24 | 192.168.1.1 | 110 |
| 10.0.3.0/24 | 192.168.2.1 | 120 |

2007/3/9 15:30:00    ROUTING TABLE

| destination | nexthop | cost |
|---|---|---|
| 10.0.1.0/24 | 192.168.1.1 | 100 |
| 10.0.2.0/24 | 192.168.1.1 | 110 |
| 10.0.3.0/24 | 192.168.1.1 | 150 |

2007/3/11 3:15:30    ROUTING TABLE

| destination | nexthop | cost |
|---|---|---|
| 10.0.1.0/24 | 192.168.1.1 | 100 |
| 10.0.2.0/24 | 192.168.1.1 | 130 |

| | | |
|---|---|---|
| 2007/3/1 | 00:00:00 | 192.168.1.1, 110 |
| 2007/3/11 | 3:15:30 | 192.168.1.1, 130 |

10.0.3.0/24

| | | |
|---|---|---|
| 2007/3/1 | 00:00:00 | 192.168.2.1, 120 |
| 2007/3/9 | 15:30:00 | 192.168.1.1, 150 |
| 2007/3/11 | 3:15:30 | disappear |

# PATH MANAGEMENT DEVICE AND PROGRAM STORING MEDIUM

BACKGROUND OF THE INVENTION

1. Field of the Invention

The present invention relates to a path management device that manages information of a communication path (hereinafter, referred to simply as a 'path'), and to a storing medium for storing a computer program.

Priority is claimed on Japanese Patent Application No. 2007-167398, filed Jun. 26, 2007, the content of which is incorporated herein by reference.

2. Description of Related Art

The Internet is formed by mutually connecting autonomous TCP (Transmission Control Protocol)/IP (Internet Protocol) networks (Autonomous Systems: AS) belonging to individual organizations (such as Internet Service providers (ISP), business organizations, and the like). AS are formed as collections of network connection tools (such as routers and the like) that operate under a common path control policy. A router possesses a routing table and forwards packets based on the routing table. The routing table is formed by a list of path information. The path information contains prefixes (a combination of IP addresses and bit numbers of subnet masks) which are a collection of destination addresses, IP addresses of next hop routers that are used to arrive at the prefixes, and the cost. When path information having a prefix that includes a particular destination address is contained in the routing table, there is the fact that a path from the router to this destination address exists.

Conventionally, in a communication network which uses IP (referred to below simply as an 'IP network'), which path is used to transmit a packet is controlled (i.e., is path-controlled) by a routing protocol. By monitoring this routing state, network operators try to become aware as quickly as possible when a failure occurs on a path in the IP network and to also ascertain when this path is restored, and to thereby achieve stable running of the IP network. Because of this, network operators may on occasion investigate the routing table of a router during an IP communication failure investigation of their own host AS.

The following two methods are known as examples of conventional routing table investigation methods. The first method is to login directly to each router within the host AS, and to give a command to read the routing table therein. The second method is to use a software tool to read the routing table in a router. More specific information can be found by referring to the Internet website "http://www.nanog.org/lookingglass.html" (this address was valid as of Jun. 6, 2007). In the method which uses software tools, an interface to the command line of the router is presented to a user. By inputting a router command on the web on which this tool is operating, the tool logs in to the router and executes the input command, and then displays the results of this action. As a result, a user is able to investigate the routing table of a router without logging in directly to the router.

However, in the above described conventional routing table investigation methods, the problems described below exist that cause a reduction in the work efficiency of the routing table investigation.

(1) Because a user logs into a router and executes a command, in some cases there is a delay in the response to the command such as when there is a heavy burden on the router or when the network traffic is heavy. In this case, there is a delay between when the network operator inputs the command and when the routing table is displayed, which leads to a deterioration in work efficiency.

(2) Because each one of a plurality of routers inside the AS is logged onto individually and then executes the command individually, considerable time is needed for a network operator to refer to the routing tables of all the routers.

(3) If a large number of commands are executed within a short time span, there is a possibility that an excessive load will be placed on the router.

(4) Although it is possible to obtain a routing table at the time when the command is executed, it is naturally not possible to obtain past routing tables. Because of this, it is not possible to compare the current path state with past path states.

SUMMARY OF THE INVENTION

The present invention was conceived in view of the above described circumstances. It is an object of the present invention to provide a path management device that makes it possible to achieve an improvement in work efficiency of a routing table investigation, and also to provide a storing medium on which a computer program is stored.

In order to solve the above described problems, the path management device of the present invention manages information about communication paths in a communication network, the communication network including a plurality of routers mutually connected by means of a communication line, link states between the plurality of routers being shared among each of the plurality of routers by means of link state advertisement messages that are announced from each of the plurality of routers, and routing tables being created in each of the plurality of routers based on shortest path trees, and the path management device includes: a receiving unit, programmed to be executable by the path management device that receives the link state advertisement messages; a routing table creation unit, programmed to be executable by the path management device that reproduces the shortest path trees and the routing tables of each of the plurality of routers based on the link state advertisement messages; and a routing table recording unit, programmed to be executable by the path management device that records the reproduced routing tables of each of the plurality of routers.

The path management device of the present invention, may include: a shortest path tree recording unit, programmed to be executable by the path management device that records the shortest path trees from which the reproduced routing tables are created; and a routing table re-creation unit, programmed to be executable by the path management device that determines whether or not to rewrite a shortest path tree and a routing table based on a record of a shortest path tree relating to a changed-state link upon receiving a link state advertisement message announcing a change in a link state.

The path management device of the present invention may include a cost recording unit, programmed to be executable by the path management device that records cost of each link included in the recorded shortest path tree, and the routing table re-creation unit may evaluate costs based on cost of the changed-state link and on the cost of each link included in the recorded shortest path trees, and determines whether or not to rewrite the shortest path tree.

In the path management device of the present invention, in a case in which a path included in the recorded shortest path tree can be replaced with a change-state link, and the cost of the changed-state link is equal to cost of the path which can be replaced with the changed-state link, the routing table re-} creation unit may update the shortest path tree simply by adding the changed-state link to the shortest path tree.

The path management device of the present invention may include: a path change monitoring unit, programmed to be executable by the path management device that detects a change in a routing table of one router from among the plurality of recorded routers, and creates path change data; and a path change recording unit, programmed to be executable by the path management device that records the path change data for each of the plurality of routers.

In the storing medium of the present invention for storing a computer program that executes path management processing to manage information about communication paths in a communication network, the communication network including a plurality of routers mutually connected by means of a communication line, link states between the plurality of routers being shared among each of the plurality of routers by means of link state advertisement messages that are announced from each of the plurality of routers, and routing tables being created in each of the plurality of routers based on shortest path trees, the computer program executed by a computer, includes: a function of receiving the link state advertisement messages; a function of reproducing the shortest path trees and the routing tables of each of the plurality of routers based on the link state advertisement messages; and a function of recording the reproduced routing tables of each of the plurality of routers.

In the storing medium of the present invention for storing a computer program, the computer program executed by the computer, may include: a function of recording the shortest path trees from which the reproduced routing tables are created; and a routing table re-creation function of determining whether or not to rewrite a shortest path tree and a routing table based on a record of a shortest path tree relating to a changed-state link upon receiving a link state advertisement message announcing a change in a link state.

In the storing medium of the present invention for storing a computer program, the computer program executed by the computer, may include: a path change monitoring function of detecting a change in a routing table of one router from among the plurality of recorded routers, and creating path change data; and a function of recording the path change data for each of the plurality of routers.

As a result, the above described path management device can be realized by means of a computer.

According to the present invention, the effect is obtained that it is possible to achieve an improvement in work efficiency of a routing table investigation.

BRIEF DESCRIPTION OF THE DRAWINGS

FIG. 6 is an example of changes in a routing table to illustrate path change monitoring processing according to the embodiment of the present invention.

FIG. 7 is an example of path change data in order to illustrate the path change monitoring processing according to the embodiment of the present invention.

DETAILED DESCRIPTION OF THE INVENTION

An embodiment of the present invention will now be described with reference to the drawings.

Figure 1:
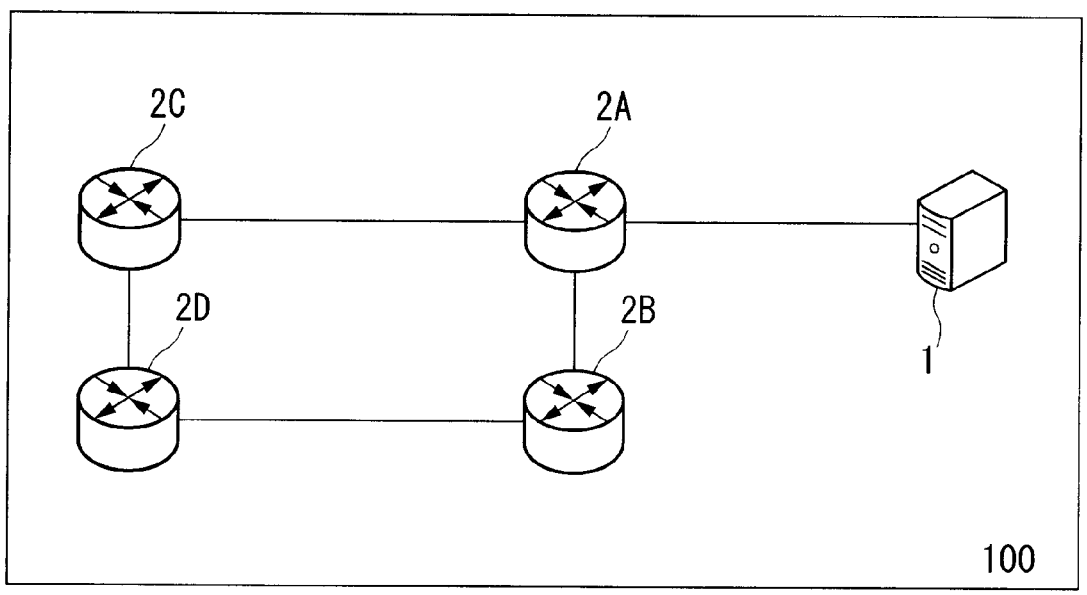
FIG. 1 shows a structural example of an IP network which is the object of the path management according to an embodiment of the present invention.

FIG. 1 shows a structural example of an IP network 100 which is the object of the path management according to an embodiment of the present invention. The IP network 100 shown in FIG. 1 is formed by a plurality of routers 2A through 2D being connected by a communication line. The IP network 100 is an AS belonging to, for example, an ISP or business organization or the like. The IP network 100 uses OSPF (Open Shortest Path First) as a routing protocol. A detailed description of OSPF is disclosed in the technical specification booklet "Request For Comments: RFC": [RFC2328 "OSPF Version 2"] published by IETF (Internet Engineering Task Force).

In OSPF, each of the routers 2A through 2D that make up the IP network 100 announces its own link state (i.e., the communication link connection state and the communication link cost and the like) to the entire IP network 100 using a link state advertisement (LSA) message. The routers 2A through 2D receive the LSA emitted by the other routers 2A through 2D, and create a link-state database (LSDB) from the received LSA. The LSDB records in a matrix format whether or not connections exist between the routers 2A through 2D. When a connection (i.e., link) does exist connecting one of the routers 2A through 2D to another of the routers 2A through 2D, the LSDB records the cost of this link. Based on the LSDB, the routers 2A through 2D create shortest path trees where the cost from themselves to the destination in the IP network 100 is the smallest. The routers 2A through 2D create routing tables based on the shortest path trees.

In OSPF, the routers 2A through 2D transmit their own link state at regular intervals using LSA (Refresh LSA). In OSPF, in addition to this, if there is a change in their own link state, for example, if it is detected that a communication link connected to the router has been cut off, or if there is a change in the cost of the communication link, an LSA is transmitted. If the routers 2A through 2D receive an LSA whose message contents differ from previously received LSA, the LSDB is rewritten, and the shortest path tree and routing table are re-created. Accordingly, if the LSA messages on an IP network 100 where OSPF is operating are collected and monitored, it is possible to detect changes in the path state of the IP network 100.

In the IP network 100 shown in FIG. 1, a path management device 1 is connected to any one of the routers 2A through 2D (to the router 2A in FIG. 1) to establish an OSPF neighbor relationship with the router 2A. As a result, the path management device 1 is able to receive the LSA that have been announced within the IP network 100 via the router 2A. The path management device 1 creates an LSDB based on the received LSA. This created LSDB has the same contents as the LSDB held by each of the routers 2A through 2D. As a result, the path management device 1 creates a shortest path tree and also creates a routing table for each of the routers 2A through 2D based on the LSDB. Accordingly, it is possible to reproduce the shortest path tree and routing table of each of the routers 2A through 2D.

When an AS is divided into a plurality of areas, then by providing a path management device 1 in each area unit, it is possible to reproduce the routing table of each of the routers 2A through 2D in each area.

Figure 2:
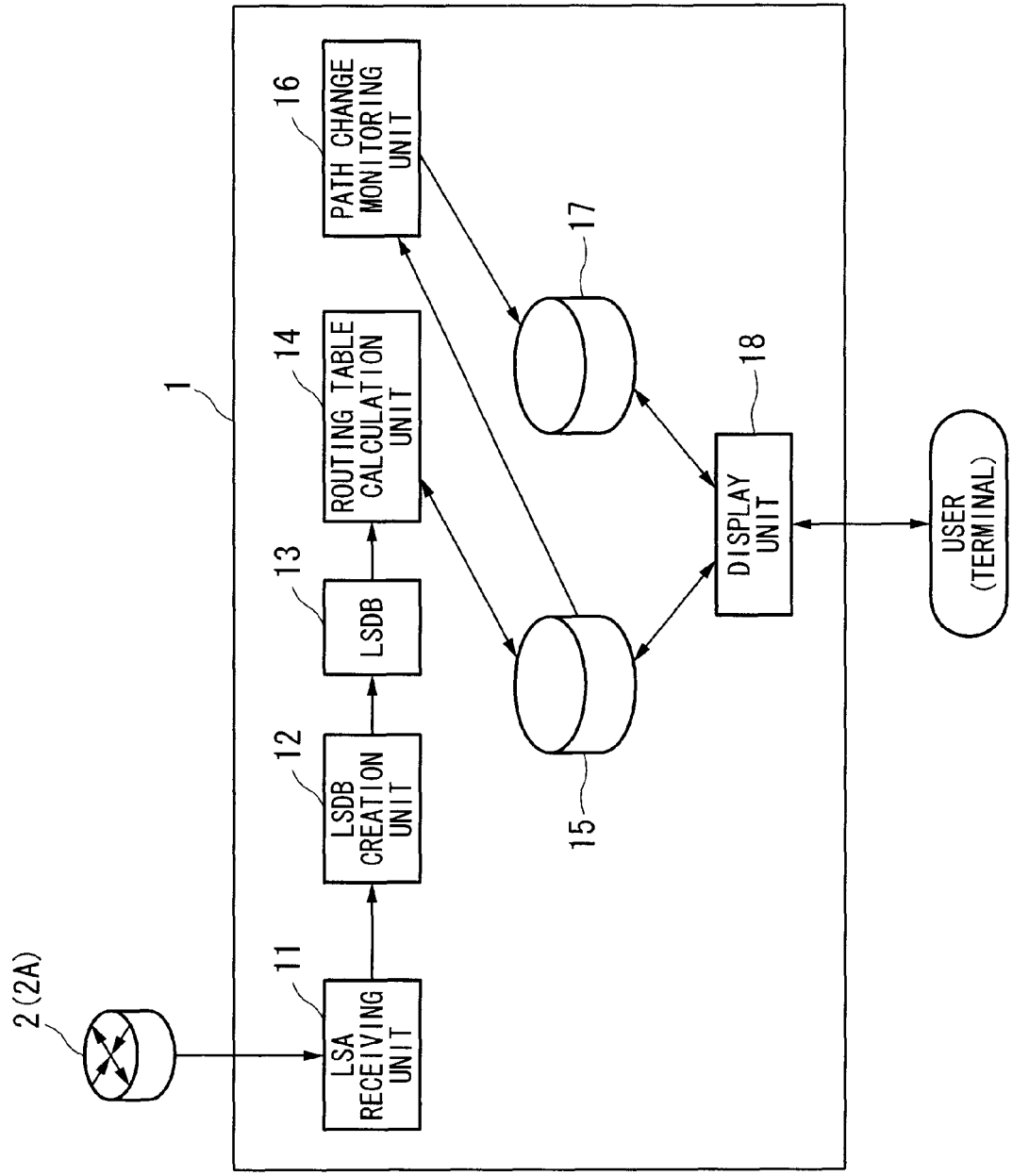
FIG. 2 is a block diagram showing the structure of the path management device shown in FIG. 1.

FIG. 2 is a block diagram showing the structure of the path management device 1 shown in FIG. 1. In FIG. 2, the path management device 1 has an LSA receiving unit 11, programmed to be executable by the path management device, an LSDB creation unit 12, programmed to be executable by the path management device, and a LSDB 13, a routing table calculation unit 14, programmed to be executable by the path management device, a routing table database 15, a path change monitoring unit 16, programmed to be executable by the path management device, a path change database 17, and a display unit 18.

The LSA receiving unit 11 receives LSA from the router 2A with which it has established an OSPF neighbor relationship. The LSDB creation unit 12 creates the LSDB 13 based on the received LSA. The routing table calculation unit 14 creates a shortest path tree based on the LSDB 13 for each of the routers 2A through 2D, and then creates routing tables based on the shortest path trees. The created routing tables of each router are stored in the routing table database 15. The routing table calculation unit 14 executes routing table re-creation processing when it detects a change in a link state.

The most recent routing table as well as past routing tables for each of the routers 2A through 2D are accumulated in the routing table database 15. The shortest path tree on which the most recent routing table was based is also stored for each of the routers 2A through 2D in the routing table database 15. The cost of each link included in the stored shortest path tree is also recorded in the routing table database 15.

The path change monitoring unit 16 detects path changes for each of the routers 2A through 2D from the routing tables in the routing table database 15, and creates data for the changed portions of the path. The created path change data for each router is stored in the path change database 17. Path change data for each of the routers 2A through 2D is accumulated in the path change database 17.

The display unit 18 displays the contents of the routing table database 15 or the path change database 17 on a terminal in response to an access made by a user (via the terminal). For example, it is made possible to refer the routing table database 15 and the path change database 17 by receiving an access from a terminal via a website. As a result, a network operator is able to refer easily and quickly to the most recent routing table as well as past routing tables for each router by referring to the routing table database 15. The network operator is also able to easily and quickly ascertain any path changes by referring to the path change database 17.

Next, operations of the path management device 1 shown in FIG. 2 will be described.

Firstly, when the path management device 1 is connected to the IP network 100 and the OSPF is operated, the path management device 1 establishes an OSPF neighbor relationship with the router 2A. The path management device 1 then receives an LSA from this router 2A, and creates an LSDB. Next, the path management device 1 creates a routing table for each router based on the LSDB.

The procedure for creating these routing tables is the same procedure for the routers 2A through 2D. Firstly, taking the routers 2A through 2D, which are the objects of the routing table creation, as starting points, a shortest path tree connecting all of the routers 2A through 2D is created. Next, based on this shortest path tree, path information for each prefix is created, and a list of the path information (a routing table) is created. The path information contains the prefixes, IP addresses of next hop routers that are used to arrive at the prefixes, and the cost.

Next, the path management device 1 adds information about the creation time to the created routing table, and stores a routing table for each router in the routing table database 15. At this time, the shortest path tree which was used for the routing table creation is also stored for each router in the routing table database 15. The cost of each link contained in the stored shortest path trees is also recorded in the routing table database 15.

When the path management device 1 receives an LSA which is not a "Refresh LSA", it updates the LSDB. The LSA which is not a "Refresh LSA" announces changes in a link state. The path management device 1 causes changes in a link state to be reflected in the LSDB based on the contents of the LSA which is not a "Refresh LSA." Next, the path management device 1 executes routing table re-creation processing based on the updated LSDB. The path management device 1 adds information about the re-creation time to the re-created routing table and stores it in the routing table database 15.

Next, a description of the routing table re-creation processing according to the present embodiment will be described with reference to FIG. 3.

Figure 3:
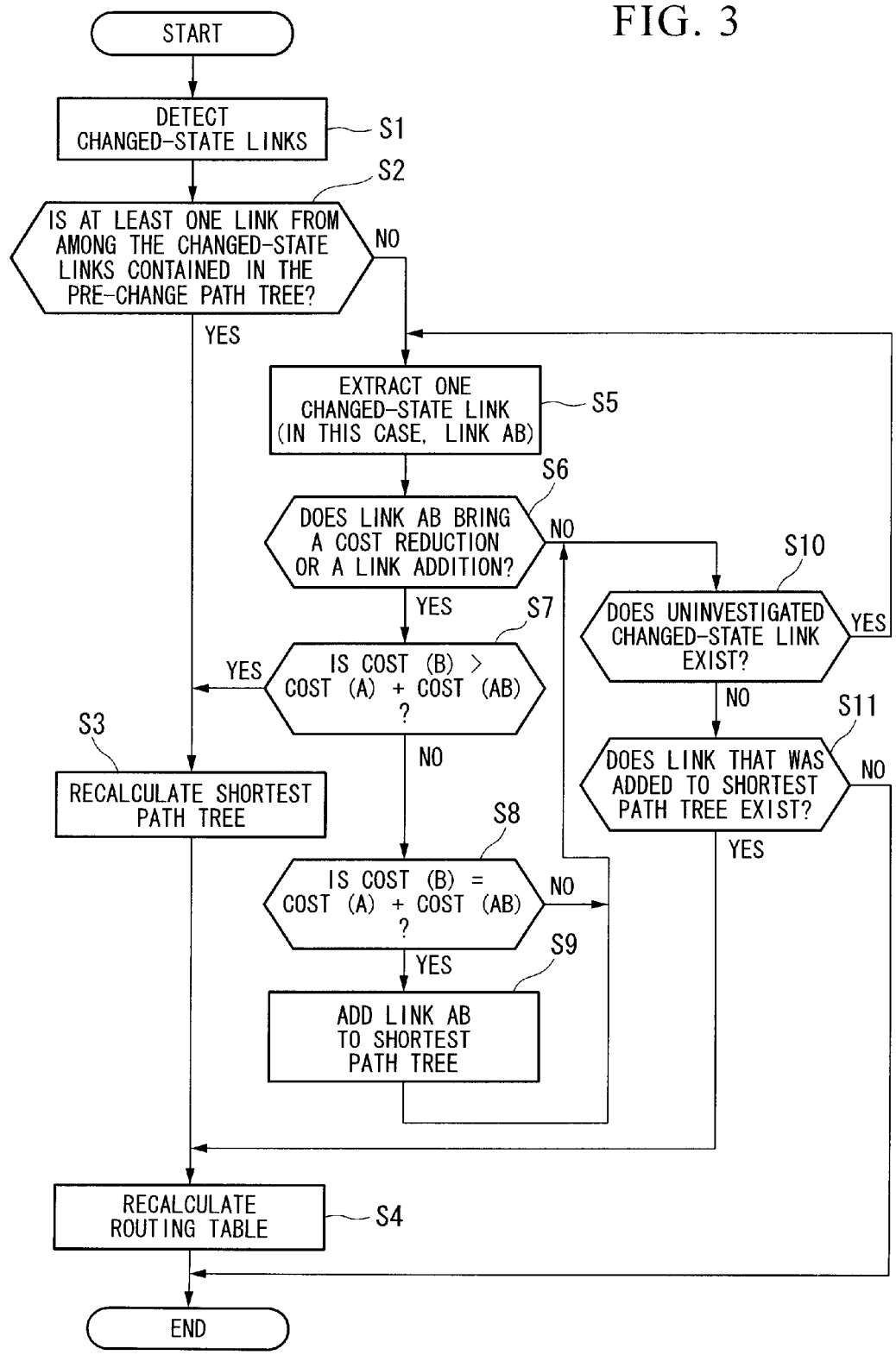
FIG. 3 is a flowchart showing the processing of routing table re-creation processing according to the embodiment of the present invention.

FIG. 3 is a flowchart showing the routine of the routing table re-creation processing according to the present embodiment.

When there is a change in a link state, it is not always inevitable that the routing tables of all of the routers 2A through 2D will be modified by this change, and it is always possible that there will be routing tables that do not require modification. Because of this, in the present embodiment, the routing table re-creation operation is controlled for each router based on the content of the change in the link state, thereby making it possible to achieve an improvement in the efficiency of the re-creation processing.

Figure 4:
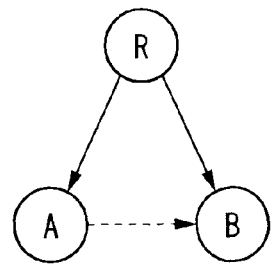
FIG. 4 is an example of a link structure between routers to illustrate the routing table re-creation processing according to the embodiment of the present invention.

Here, in order to simplify the explanation, the links between the three routers (R), (A), and (B) shown in FIG. 4 are taken as the subject, and the routing table of the router (R) is re-created as the result of a change in the state of the link AB from the router (A) to the router (B).

Firstly, in step S1, as a result of receiving an LSA announcing a change in a link state, the path management device 1 detects links whose state has changed (i.e., changed-state links) based on the received LSA. As a result, the link AB shown in FIG. 4 is detected. In step S2, a check is made as to whether or not at least one link from among the changed-state links is contained within the current shortest path tree (i.e., the shortest path tree in the routing table database 15). As a result of this, if it is found that at least one changed-state link is contained within the current shortest path tree, the shortest path tree of the router (R) is recalculated and rewritten (step S3). Next, based on this new shortest path tree, the routing table of the router (R) is recalculated and rewritten (step S4). In this case, normal routing table creation processing is performed.

Figure 5:
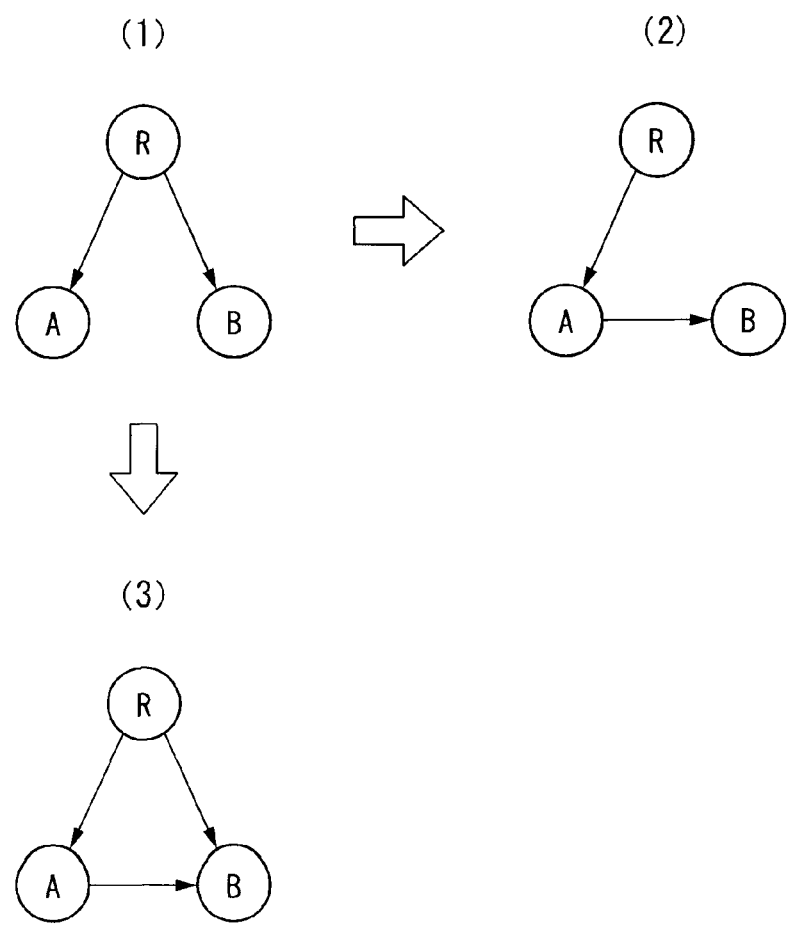
FIG. 5 is an example of shortest path trees of a router to illustrate the routing table re-creation processing according to the embodiment of the present invention.

On the other hand, if none of the changed-state links are contained in the current shortest path tree, the routine moves to step S5. In this case, the operation to re-create the routing table is controlled in accordance with the content of the change in the link state. Here, as is shown in FIG. 5 (1), it will be assumed that the link AB, which is a changed-state link, is not contained in the current shortest path tree in which the router (R) is taken as the starting point. The links that are contained in the current shortest path tree of the router (R) shown in FIG. 5 (1) are the link A extending directly from the router (R) to the router (A) and the link B extending directly from the router (R) to the router (B). The cost of each link that is contained in the current shortest path tree is recorded in the routing table database 15.

In step S5, one of the changed-state links is selected. Here, it will be assumed that the link AB is selected. In step S6, a determination is made as to whether or not the change in the link state of the link AB is a cost reduction or an addition of the link. As a result of this, if there is a cost reduction or a link addition, the routine moves to step S7, while if there is not a cost reduction or link addition, the routine moves to step S10.

In step S7, the sum of the cost of the link A and the cost of the link AB are calculated and this sum is then compared with the cost of the link B. If it is found as a result of this that the cost of the link B is greater than the sum of the cost of the link A and the link AB, then the routing table creation processing of step S3 and step S4 is performed. This is in order to rewrite the shortest path tree of the router (R) when the cost of the link B is greater than the sum of the cost of the link A and the link AB. This is because, rather than using the direct link B contained in the current shortest path tree as the path from the router (R) to the router (B), there is less cost involved in using the path via the router (A) (i.e., the link A and the link AB) which is not contained in the current shortest path tree. As a result, the shortest path tree of the router (R) is altered from the shortest path tree shown in FIG. 5 (1) to that shown in FIG. 5 (2). The routing table is then rewritten based on this altered shortest path tree.

On the other hand, if the cost of the link B is equal to or less than the sum of the cost of the link A and the link AB, the routine moves to step S8.

In step S8, a determination is made as to whether or not the cost of the link B is equal to the sum of the cost of the link A and the cost of the link AB. If it is found as a result of this that the both values are equal, then, in step S9, the link AB is added to the current shortest path tree of the router (R). At this time, the fact that a link has been added to the shortest path tree of the router (R) is recorded. As a result, the shortest path tree of the router (R) is altered from the shortest path tree shown in FIG. 5 (1) to that shown in FIG. 5 (3).

On the other hand, if the cost of the link B is less than the sum of the cost of the link A and the cost of the link AB, because this means that there is no change in the current shortest path tree in FIG. 5 (1), it is not necessary to alter the routing table of the router (R) due to changes in the state of the link AB. Accordingly, the processing which accompanies a change in the state of the link AB is ended and the routine moves to step S10.

In step S10, a determination is made as to whether or not a changed-state link exists that was selected in step S5, and if an unselected changed-state link remains, the routine moves to step S5. If, however, all the changed-state links have been selected, the routine moves to step S11.

In step S11, a determination is made as to whether or not a link has been added to the shortest path tree of the router (R). If it is found as a result of this that a link has been added, the routing table recalculation processing of step S4 is performed, and the routing table of the router (R) is rewritten. In this case, the recalculation processing (i.e. step S3) is not performed for the shortest path tree of the router (R).

On the other hand, if a link has not been added to the shortest path tree of the router (R), then because there is no need to rewrite the routing table of the router (R), the processing is ended.

As has been described above, by determining the necessity of performing recalculation processing for a shortest path tree and the necessity of performing recalculation processing for a routing table based on the content of the changes in a link state, it becomes possible to omit the recalculation processing for a shortest path tree or the recalculation processing for a routing table. As a result, it becomes possible to achieve an improvement in the efficiency of processing to re-create a routing table.

Next, an operation of the path change monitoring unit 16 shown in FIG. 2 will be described.

The path change monitoring unit 16 compares the most recent routing table with past routing tables in the routing table database 15 for each of the routers 2A through 2D, and detects any change in the routing tables. Next, the path change monitoring unit 16 extracts differential data from routing tables in which changes have been detected, and creates path change data. Next, the path change monitoring unit 16 stores the path change data for each router in the path change database 17.

Changes in the routing table of the router (A) are shown in FIG. 6 as an example of changes in a routing table. In the case of this example, firstly, the IP address (nexthop) of the neighbor router for the prefix (destination) [10.0.3.0/24] and the cost have changed in the routing table having the creation time of [2007/3/9 15:30:00] compared to the routing table having that of [2007/3/10 0:00:00]. Furthermore, the cost for the prefix [10.0.2.0/24] has changed in the routing table having the creation time of [2007/3/11 3:15:30] compared to the routing table having that of [2007/3/9 15:30:00], and additionally the path to the prefix [10.0.3.0/24] has been deleted therefrom.

When the path change monitoring unit 16 detects the changes in the routing tables shown in FIG. 6, it extracts the difference data from the routing tables and creates path change data. An example of the path change data corresponding to the changes in the routing tables shown in FIG. 6 is shown in FIG. 7. As is shown in FIG. 7, the router change data contains difference data of routing tables for each of the prefixes where there was a change. In the path change data shown in FIG. 7, the IP address of the neighbor router and the cost for the times [2007/3/10 0:00:00] and [2007/3/11 3:15:30] are shown for the prefix [10.0.2.0/24]. The IP address of the neighbor router and the cost for the times [2007/3/10 0:00:00] and [2007/3/9 15:30:00], and also the path deletion at the time [2007/3/11 3:15:30] are shown for the prefix [10.0.3.0/24].

As a result, a network operator is able to easily and quickly ascertain a path change by referring to the path change database 17.

According to the above described embodiment, a network operator is able to easily and quickly refer to the most recent routing table as well as to past routing tables for each router by referring to the routing table database 15 of the path management device 1. For example, routing tables from times in the past can be referred to using a time designation based on the creation time which is affixed to the routing table. As a result, the work efficiency of a routing table investigation is improved.

Moreover, by referring to the path change database 17 in the path management device 1, a network operator is able to easily and rapidly ascertain path changes. For example, a network operator is able to retrieve path change data for the desired conditions using designations such as router name, prefix, time range, and the like, and obtain the search results. As a result, the work efficiency of a routing table investigation is improved.

Moreover, because there is no need to log in to the routers 2A through 2D, the routers 2A through 2D are not burdened by the task of executing a command. As a result, the effect is obtained that the load on the routers 2A through 2D is lightened.

Moreover, according to the present embodiment, routing tables belonging to the respective routers 2A through 2D in the IP network 100 which is the object of the path management are collectively held. Because of this, it is possible to shorten the time required by a network operator to refer to the routing table of each router. As a result, the work efficiency of a routing table investigation is improved.

Moreover, because it is possible to manage a path change history due to the fact that past routing tables are stored, it becomes possible to detect unstable paths, so that the effect is obtained that stable running of a network can be achieved.

Note that the path management device 1 according to the present embodiment may be realized by means of dedicated hardware, or may be formed by a computer system in the form of a personal computer or the like that executes a program which is designed to provide the respective functions of the path management device 1 shown in FIG. 2, and thereby enable the functions thereof to be realized.

Furthermore, an input device, display unit and the like (omitted from the drawings) are connected as peripheral devices to this path management device 1. Here, input device refers to such as a keyboard, mouse, or the like. Display unit refused to a CRT (Cathode Ray tube) or to a liquid crystal display unit or the like. Moreover, these peripheral devices may be connected directly to the path management device 1, or alternatively they may be connected thereto via a communication line.

Furthermore, it is also possible to execute the path management processing by recording a program which is designed to provide the functions of the path management device 1 shown in FIG. 2 on a computer readable storing medium, and then allowing the programs recorded on this storing medium to be read and executed by a computer system. Note that "computer system" referred to here includes OS and hardware such as peripheral devices and the like.

Moreover, "computer system" includes a WWW system provided with a website provision environment (or display environment).

The "computer readable storing medium" refers to a flexible disk, a magnetic-optical disk, ROM, recordable nonvolatile memory such as flash memory, transportable media such as DVD (Digital Versatile Disk) and the like, and recording devices such as hard disks that are built into a computer system.

Furthermore, the "computer readable storing medium" includes a device that holds a program for a fixed time such as the internal volatile memory (for example, DRAM (Dynamic Random Access Memory)) in a computer system which forms the server or client when the program is transmitted via a network such as the Internet or via a communication line such as a telephone line.

Moreover, this program may also be transmitted from a computer system that stores the program on a recording device or the like to another computer system via a transmission medium or by means of a transmission wave in a transmission medium. Here, the "transmission medium" which transmits the program refers to a medium having a function of transmitting information such as a network (communication network) such as the Internet or a communication circuit (communication line) such as a telephone line.

Moreover, the above described program may also be designed to realize a portion of the above described functions. Furthermore, the program may be one that realizes the functions described above in a combination of a program already recorded on the computer system, namely, a differential file (differential program).

In the above, the embodiments of the invention are described in detail with reference to the drawings, but its specific structure is not to be considered as being restricted to the embodiments; it also may includes design modifications, as long as they do not depart from the gist of the invention.

What is claimed is:

1. A path management device that manages information about communication paths in a communication network, the communication network including a plurality of routers mutually connected by means of a communication line, link states between the plurality of routers being shared among each of the plurality of routers by means of link state advertisement messages that are announced from each of the plurality of routers, and routing tables being created in each of the plurality of routers based on shortest path trees, the path management device comprising:
   a receiving unit that receives the link state advertisement messages;
   a routing table creation unit that reproduces the shortest path trees and the routing tables of each of the plurality of routers based on the link state advertisement messages;
   a routing table recording unit that records the reproduced routing tables of each of the plurality of routers;
   a shortest path tree recording unit that records the reproduced shortest path trees from which the reproduced routing tables are created;
   a routing table re-creation unit that determines whether or not to rewrite a shortest path tree and a routing table based on a record of a shortest path tree relating to a changed-state link upon receiving a link state advertisement message announcing a change in a link state,
   wherein the routing table re-creation unit rewrites a shortest path tree and a routing table, and the routing table recording unit accumulates the reproduced routing tables and the rewritten routing table;
   a path change monitoring unit that compares the reproduced routing tables with the rewritten routing table, and creates path change data that is differential data between the reproduced routing tables and the rewritten routing table; and
   a path change recording unit that records the path change data for each of the plurality of routers.

2. The path management device according to claim 1, comprising
   a cost recording unit, programmed to be executable by the path management device that records cost of each link included in the recorded shortest path tree,
   wherein the routing table re-creation unit evaluates costs based on cost of the changed-state link and on the cost of each link included in the recorded shortest path trees, and determines whether or not to rewrite the shortest path tree.

3. The path management device according to claim 2, wherein, in a case in which a path included in the recorded shortest path tree can be replaced with a change-state link, and the cost of the changed-state link is equal to cost of the path which can be replaced with the changed-state link, the routing table re-creation unit updates the shortest path tree simply by adding the changed-state link to the shortest path tree.

4. A non-transitory storing medium for storing a computer program that executes path management processing to manage information about communication paths in a communication network, the communication network including a plurality of routers mutually connected by means of a communication line, link states between the plurality of routers being shared among each of the plurality of routers by means of link state advertisement messages that are announced from each of the plurality of routers, and routing tables being created in each of the plurality of routers based on shortest path trees, the computer program, executed by a computer, comprising:

- a function of receiving the link state advertisement messages;
- a function of reproducing the shortest path trees and the routing tables of each of the plurality of routers based on the link state advertisement messages;
- a function of recording the reproduced routing tables of each of the plurality of routers;
- a function of recording the reproduced shortest path trees from which the reproduced routing tables are created;
- a routing table re-creation function that determines whether or not to rewrite a shortest path tree and a routing table based on a record of a shortest path tree relating to a changed-state link upon receiving a link state advertisement message announcing a change in a link state, wherein in the routing table re-creation function, a shortest path tree and a routing table are rewritten, and in the function of recording, the reproduced routing tables and the rewritten routing table are accumulated;

a path change monitoring function of comparing the reproduced routing tables with the rewritten routing table, and creating path change data that is differential data between the reproduced routing tables and the rewritten routing table; and a function of recording the path change data for each of the plurality of routers.

* * * * *